United States Patent
Ye et al.

(10) Patent No.: US 10,724,649 B2
(45) Date of Patent: Jul. 28, 2020

(54) MIXING VALVE

(71) Applicant: XIAMEN LOTA INTERNATIONAL CO., LTD., Fujian (CN)

(72) Inventors: Liming Ye, Fujian (CN); Jianping Zhou, Fujian (CN); Shuanglin Bai, Fujian (CN); Lucheng Wang, Fujian (CN)

(73) Assignee: XIAMEN LOTA INTERNATIONAL CO., LTD., Fujian (CN)

( * ) Notice: Subject to any disclaimer, the term of this patent is extended or adjusted under 35 U.S.C. 154(b) by 30 days.

(21) Appl. No.: 15/981,288

(22) Filed: May 16, 2018

(65) Prior Publication Data
US 2018/0259082 A1    Sep. 13, 2018

Related U.S. Application Data

(62) Division of application No. 15/061,794, filed on Mar. 4, 2016, now abandoned.

(30) Foreign Application Priority Data

May 20, 2015    (CN) .......................... 2015 1 0257855

(51) Int. Cl.
   *F16K 11/00*    (2006.01)
   *F16K 11/074*    (2006.01)
   *G05D 23/13*    (2006.01)

(52) U.S. Cl.
   CPC .......... *F16K 19/006* (2013.01); *F16K 11/074* (2013.01); *G05D 23/1313* (2013.01)

(58) Field of Classification Search
None
See application file for complete search history.

(56) References Cited

U.S. PATENT DOCUMENTS 3,397,863 A    8/1968    Bell
4,089,348 A    5/1978    Christo
(Continued)

FOREIGN PATENT DOCUMENTS

CN    20196275 Y    2/2009
CN    202252102 U    5/2012
(Continued)

OTHER PUBLICATIONS

English Abstact for CN10148866B; 1 pg.
(Continued)

*Primary Examiner* — John Fox
(74) *Attorney, Agent, or Firm* — Cantor Colburn LLP (57) ABSTRACT

In the present invention a mixing valve is provided, comprising a valve seat provided with first and second fluid conduits and a mixed fluid conduit and including a first plug-fit portion and a first mounting portion, and a valve core defining first and second stop surfaces. The valve core comprises a valve housing provided with a second plug-fit portion configured to be mated with the first plug-fit portion, a valve shaft disposed within the valve housing and provided with a valve plate comprising a first regulating aperture and a second regulating aperture, a stop member mounted on the valve shaft, the valve core defining an initial position in which the stop member engages with the first stop surface and a final position in which the stop member engages with the second stop surface, and a valve module. The mixing valve further comprises a pressing cover provided with a second mounting portion to be detachably mounted to the first mounting portion, wherein the valve core is tightly pressed between the pressing cover and the valve seat. In the present invention a valve core and a mixing valve assembly comprising such valve core are also provided.

12 Claims, 10 Drawing Sheets

(56) References Cited

U.S. PATENT DOCUMENTS

| | | | | |
|---|---|---|---|---|
| 4,362,186 | A | * | 12/1982 | Parkison .............. F16K 11/0787 137/360 |
| 4,397,330 | A | * | 8/1983 | Hayman .............. F16K 11/0746 137/270 |
| 4,423,752 | A | * | 1/1984 | Psarouthakis ......... F16K 11/022 137/270 |
| 4,633,906 | A | | 1/1987 | Tuchman |
| 4,981,156 | A | * | 1/1991 | Nicklas ............... F16K 11/0746 137/270 |
| 5,445,181 | A | * | 8/1995 | Kuhn .................. F16K 11/0782 137/98 |
| 5,713,391 | A | | 2/1998 | Ko |
| 5,725,010 | A | | 3/1998 | Marty et al. |
| 5,806,552 | A | * | 9/1998 | Martin, Jr. .......... F16K 11/0782 137/270 |
| 6,123,105 | A | | 9/2000 | Yang |
| 6,182,682 | B1 | | 2/2001 | Chen |
| 6,237,622 | B1 | * | 5/2001 | Cook .................... F16K 11/074 137/270 |
| 6,626,203 | B1 | * | 9/2003 | Schneider ............ F16K 11/074 137/270 |
| 6,805,151 | B1 | * | 10/2004 | Chang ................. F16K 11/0743 137/270 |
| 7,007,717 | B2 | * | 3/2006 | Lin ..................... F16K 11/0743 137/625.41 |
| 8,118,057 | B2 | | 2/2012 | Deutsch et al. |
| 9,016,302 | B2 | | 4/2015 | Tung |
| 2006/0032540 | A1 | | 2/2006 | Yang |
| 2012/0180887 | A1 | | 7/2012 | Yan |

FOREIGN PATENT DOCUMENTS

| | | |
|---|---|---|
| CN | 101418866 B | 6/2012 |
| CN | 102644765 A | 8/2012 |
| CN | 103062438 A | 4/2013 |
| CN | 104048094 A | 9/2014 |
| CN | 203847751 U | 9/2014 |
| CN | 204878859 U | 12/2015 |

OTHER PUBLICATIONS

English Abstract for CN201196275Y; 2 pgs.
English Abstract for CN202252102U; 1 pg.
English Machine Translation to CN102644765 Abstract.
English Machine Translation to CN103062438 Abstract.
English Machine Translation to CN104048094 Abstract.
English Machine Translation to CN203847751 Abstract.
English Machine Translation to CN204878859 Abstract.
English Translation to Search Report for Application No. 2015102578557.
English Translation to Supplementary Search Report for Application No. 2015102578557.
Search Report for Application No. 2015102578557.
Supplementary Search Report for Application No. 2015102578557.

* cited by examiner

MIXING VALVE

CROSS REFERENCE TO RELATED APPLICATIONS

This application is a divisional application of U.S. patent application Ser. No. 15/061,794 filed on Mar. 4, 2016, which claims priority under 35 U.S.C. § 119 to following Chinese Patent application no. CN 201510257855.7, filed May 20, 2015, the entire contents each of which are incorporated herein by reference thereto.

FIELD

The present invention relates to the field of valve, and in particular to a mixing valve.

BACKGROUND

The mixing valve is known that is used in a bathroom or washroom to mix a cold water and a hot water, and is able to regulate a mixing ratio (i.e. water temperature) and a flow rate of the cold and hot waters. In general, such mixing valve comprises a valve seat connected to a cold water tube, a hot water tube and a warm water tube that are laid out in a room. Usually, such mixing valve is operated between two extreme conditions, i.e. a closing position, in which no water flows out through the mixing valve, and a hot-water maximum position of the mixing valve, in which the water has a highest water temperature and a maximum flow rate of hot water, by rotating the handle of the mixing valve in a range between two extreme rotation positions. To improve the performance of the mixing valve, incorporated in a valve core are two check valves for sealing connecting with a cold water outlet and a hot water outlet in the valve seat, respectively, so as to prevent the cold and hot waters from being mixed with or cross flowing to each other before passing through a mix regulating mechanism (such as a valve plate) in the valve core, and further a pressure balancing valve arranged downstream the check valves, so as to balance the pressures of the cold and hot waters flowing into the valve core and to prevent the pressures of the cold water from the cold water tube or of the hot water from being sharply increased to cause sudden increasing or decreasing of the outflow water temperature.

Chinese invention patent CN 101418866B discloses a mixing valve, comprising a valve body (which is actually a valve seat), a cartridge assembly including check valves and a pressure balancing valve, an outer valve assembly for regulating a temperature and a flow rate of a water, a nut collar for retaining the cartridge assembly and the outer valve assembly onto the valve body by means of threaded connection to the valve body, and a handle. The outer valve assembly of such mixing valve comprises a stem connected to the handle, a stem receiver unrotatably connected to the stem and having a stop surface and a valve plate, a cap nested over the stem receiver and having a stop surface configured to engage with the stem receiver to define a clockwise extreme position, a disk unrotatably connected to the stem and having a stop surface, and a stop member nested over the disk and having a stop surface configured to engage with the stop surface of the disk to define a counterclockwise extreme position (hot-water maximum position). When a user opens the mixing valve to the hot-water maximum position by rotating the handle, the torque acting on the stop surface is transferred starting from the handle, via the proximal end (top end) of the stem, the disk at the middle portion of the stem, the stop member and the cap, to the sidewall of the valve body; when the user closes this mixing valve, the operating torque is transferred starting from the handle, via the proximal end of the stem, the stem receiver at the distal end (bottom end) of the stem, and the cap, to the sidewall of the valve body. It can be seen that in such mixing valve, the operating torque has to be transferred through multiple components and has a long path to be transferred, which is disadvantageous in bearing a relatively greater twisting force exerted by the user.

Chinese Utility Model patent CN 202252102U discloses a constant temperature control device to be mounted within a water channel member (i.e. the valve seat of the present invention), comprising a temperature control rod assembly, a fine adjusting mechanism, a check valve, and a pressure balancing valve. When a user opens such constant temperature control device to the hot-water maximum position or closes the device to the closing position, the operating torque applied by the user is transferred starting from the handle, via the temperature control rod, a stop member of the fine adjusting mechanism, the housing of the fine adjusting mechanism, and a lower housing seat, to the valve seat. This arrangement causes that the operating torque to be transferred through an interface between the housing of the fine adjusting mechanism and the lower housing seat having a relatively lower load carrying capacity. Accordingly, it is still disadvantageous in bearing the relatively greater twisting force exerted by the user who typically intends to operate the valve with an excess force.

Chinese Utility Model patent CN201196275Y discloses a cold and hot water control valve configuration for faucet, structurally similar to the configuration disclosed in CN 202252102U, and thus has to suffer the same deficiencies of poor ability to withstand the operating torque applied by the users.

In addition, when the cold and hot water tubes are mounted in a reversed manner, the mixing valve has to be retrofitted to allow the operator to operate the handle in the same direction within the same rotation range. such reversion of cold and hot water tubes exists for example in two adjacent bathrooms at either side of the same wall. In the case that the prior art mixing valve usually has to comprise a separate stop member abutment, when the mixing valve is retrofitted, the stop member abutment and the stop member arranged thereon have to be first detached, then rotated and then re-installed in a different angle position, which increases the labor work of the worker and the risk of mis-installation.

Therefore, there is a need for a mixing valve that provides solution to the problems mentioned above.

SUMMARY

One object of the present invention is to alleviate or eliminate the problem of the poor ability of the mixing valve to withstand the twisting force. For the object, the present invention provides a mixing valve for mixing first and second fluids, comprising: a valve seat provided with a first fluid conduit, a second fluid conduit and at least one mixed fluid conduit, and comprising a first plug-fit portion and a first mounting portion; a valve core defining first and second stop surfaces and comprising: a valve housing provided at a bottom thereof with a second plug-fit portion configured to be mated with the first plug-fit portion and provided at a top thereof with a housing hole; a valve shaft rotatably received in the valve housing, with a top portion of the valve shaft extending out from the housing hole, and a bottom portion of the valve shaft provided with a valve plate including a first regulating aperture and a second regulating aperture, wherein the first regulating aperture is configured to selectively communicate with the first fluid conduit and the second regulating aperture is configured to selectively communicate with the second fluid conduit; a stop member mounted on the portion of the valve shaft extending out from the housing hole, wherein the valve core defines an initial position in which the stop member engages with the first stop surface and a final position in which the stop member engages with the second stop surface; and a valve module arranged between the regulating apertures on one hand and the first and second fluid conduits on the other hand. The mixing valve further comprises a pressing cover provided at a bottom thereof with a second mounting portion to be detachably mounted to the first mounting portion and provided at a top thereof with a cover hole through which the valve core passes, wherein the valve core is tightly pressed between the pressing cover and the valve seat.

Such mixing valve is able to transmit the operating torque exerted by rotation of the handle by the user starting from the handle, via valve shaft, the stop member located at the proximal end of the valve shaft, and the valve housing, then to the valve seat, which leads to less component in the torque transmitting path and a reduced length of the transmitting path, thereby improving the load resistance of the mixing valve.

According to an embodiment of the present invention, the valve housing has an adjusting seat integral with the valve housing and forming the first stop surface. By forming on the valve housing the first stop surface for defining the closing position of the mixing valve, the torque exerted to the stop surface by the user when closing the valve can be directly transmitted through valve housing to the valve seat which is for example fixed on a wall, such that the mixing valve is capable of withstanding a greater closing torque, and thus meets the requirement on a safe twisting force.

According to an embodiment of the present invention, the valve core further comprises an adjusting ring fitted onto the adjusting seat and forming the second stop surface. Such temperature adjusting mechanism is convenient to manufacture, and is easy to operate.

According to an embodiment of the present invention, the valve plate comprises a first layer and a second layer spaced apart from each other in a distance, wherein formed between the first and second layers is a mixing chamber in fluid communication with the mixed fluid conduit. Such configuration allows a sufficient space for mixing the fluids, and is advantageous for the valve plate to bear the pressure of the fluids.

According to an embodiment of the present invention, the valve module is provided at a top thereof with sealing gaskets sealingly connected to the first and second regulating apertures, respectively, wherein the sealing gaskets are made of ceramic or rubber. By providing the sealing gaskets, the fluid is prevented from being escaped from the gaps between the valve plate and the valve module. It has been experimentally proven that the ceramic or rubber sealing gaskets may ensure the sealing effect.

According to an embodiment of the present invention, the valve module comprises a first check valve sealingly connected to the first fluid conduit and a second check valve sealingly connected to the second fluid conduit, and further comprises a pressure balancing valve subassembly for balancing the pressures of the first and second fluids within the valve module. Providing the check valves can be beneficial to prevent the first and second fluids from being mixed with or cross flowing to each other before flowing into the valve module. Providing the balancing valve can prevent the temperature of the warm water from being changed in a sudden caused by the flow rate change of the cold or hot water in the water tubes.

According to an embodiment of the present invention, an inner spline is provided at inside of the adjusting ring and an outer spline is provided at outside of the adjusting seat, and the adjusting ring is configured to be fitted onto the adjusting seat in variable angles by means of mating of the inner spline with the outer spline so as to adjust the final position. This arrangement can achieve a simple way of adjusting the water temperature, and is beneficial to the operation by the user and maintenance.

According to a further aspect of the present invention, the technical solution of the invention also alleviates or eliminates the difficulty in retrofitting the mixing valve when the cold and hot water tubes are reversed.

Therefore, the present invention provides a valve core for a mixing valve, comprising: a first stop surface and a second stop surface; a valve housing having a housing hole at a top thereof; a valve shaft rotatably received in the valve housing, with a top portion of the valve shaft extending out from the housing hole, and a bottom portion of the valve shaft provided with a valve plate including a first regulating aperture and a second regulating aperture; and a stop member, wherein the valve core defines an initial position in which the stop member engages with the first stop surface and a final position in which the stop member engages with the second stop surface, wherein the stop member is adjustably mounted to the portion of the valve shaft extending out from the housing hole so as to selectively protrude at either the first side or the second side of the valve shaft.

Such valve core can be retrofitted in the reversed hot and cold water tubes in the adjacent bathrooms, simply by moving the stop member to be protruded from either the first side of the valve shaft or the second side, which is advantageous in saving the labor cost for the retrofitting. This valve core has a better adaptability to the hot and cold water tubes that are reversely laid, such that the user can control and operate the mixing valve with such valve core in the same manner, e.g., in the same direction of rotation and in the same range of angle, in two adjacent shower systems such as in bathrooms in which the cold and hot water tubes are reversed, which is more suitable for day life use of the users. Accordingly, using such valve core can be beneficial to realizing the standardization and operating convenience of the mixing valve.

According to an embodiment of the present invention, arranged within the valve shaft is a through hole transversely extending through the valve shaft and the stop member is configured as a pin adapted to be in the through hole. It has been proven that such stop member with such mounting means operates reliably, and is easy to manufacture.

According to an embodiment of the present invention, the pin has an outer threaded portion and the through hole has an inner threaded portion configured to be mated with the outer threaded portion. Such threaded connection can allow to ease the movement and positioning of the stop member in the through hole.

The present invention further provides a mixing valve assembly comprising the aforesaid valve core, and further comprising: a valve seat provided with a first fluid conduit, a second fluid conduit and at least one mixed fluid conduit; a pressing cover, the valve core being tightly pressed between the pressing cover and the valve seat; and a handle configured to be connected to the valve shaft; wherein the mixing valve assembly has a first installing configuration in which the stop member protrudes at the first side of the valve shaft and the handle is connected in a first orientation relative to the valve shaft and a second installing configuration in which the stop member protrudes at the second side of the valve shaft and the handle is connected in a second orientation relative to the valve shaft.

Such mixing valve assembly may provide convenience in retrofitting for the installation person, with lower labor cost and lower risk of mis-installation. Also, such mixing valve assembly provides a better adaptability to the hot and cold water tubes that are reversely laid, such that the user may control and operate the mixing valve assembly in the same manner, e.g., in the same direction of rotation and in the same range of angle, in two adjacent shower systems such as in bathrooms in which the cold and hot water tubes are reversed, which is more suitable for day life use of the users. Accordingly, using such mixing valve assembly can be beneficial to realizing the standardization and operating convenience of the mixing valve assembly.

According to an embodiment of the present invention, a top portion of the valve shaft has two truncated planes parallel to each other, and the handle comprises a receiving bore for receiving the top portion of the valve shaft, wherein the receiving bore includes on an inner wall thereof two corresponding truncated planes parallel to each other, such that the first orientation is offset from the second orientation by an angle of 180°, such that the handle may be connected to the valve shaft in two angle positions which are offset from each other by 180°. This configuration can realize a multi-angle mounting of the handle in a cost-effective way.

The present invention further relates to a method for installing the mixing valve assembly. The present invention further relates to a method for retrofitting the mixing valve assembly for being used to an adjacent shower head.

Other features and advantages of the present invention will be further described hereinafter in the specific embodiments.

BRIEF DESCRIPTION OF DRAWINGS

The preferred embodiments of the invention will be described in detail below in combination with the accompanying drawings in which.

DETAILED DESCRIPTION

Referring to FIGS. 1-4, the mixing valve 100 according to one embodiment of the invention is shown in an initial position or closing position. The mixing valve 100 comprises a valve seat 1, a valve core 2 mounted onto the valve seat 1, and a pressing cover 3 tightly pressing the valve core 2 against the valve seat 1. For ease of description, hereinafter water is referred representing the fluid, cold water representing the first fluid, hot water representing the second fluid, and warm water representing the mixed fluid. However, it is understood by the skilled in the art that the first and second fluids and the mixed fluid may be any suitable fluid.

Provided within the valve seat 1 are a cold water conduit 14, a hot water conduit 15 and a mixed fluid conduit 16. The cold water conduit 14 has a cold water inlet 14a sealingly connected to cold water tubes 201, 201' (FIG. 17) which are for example laid in a wall, and a cold water outlet 14b sealingly connected to the valve core 2. The hot water conduit 15 has a hot water inlet 15a sealingly connected to hot water tubes 301, 301' (FIG. 17) which are for example laid in the wall, and a hot water outlet 15b sealingly connected to the valve core 2. The warm water conduit 16 has an upper warm water outlet 16a, e.g. communicating with a shower nozzle and a lower warm water outlet 16a' e.g. communicating with a lower water faucet. The valve seat 1 is provided at its center with an accommodating cavity 12 surrounding the cold water outlet 14b and a hot water outlet 15b for receiving the valve core 2. The accommodating cavity 12 is provided with a flange 32 along the periphery thereof, and the flange 32 on its outer surface has a first mounting portion 13 to be connected to the cover 3. In the illustrated embodiment, the first mounting portion 13 is in the form of screw threads. However, it can be appreciated that the first mount portion may be any suitable connection including, but not limited to, plugging, snap fitting, riveting, pin-hole connection, or any combination thereof.

The accommodating cavity 12 is provided at its bottom with the above-mentioned cold and hot water outlets 14b, 15b, as well as a first plug-fit portion 11 configured to be mated with a second plug-fit portion 218 of the valve core 2. Here, the first plug-fit portion 11 is in the form of a circular recess, and the second plug-fit portion 218 (see FIG. 10) is in the form of a semi-circular foot.

It can be understood by the skilled in the art that the first and second plug-fit portions 11, 218 may be various shapes and fittings as desired, as long as they are capable of effectively transmitting force or torque by means of plug fitting. For example, the first plug-fit portion 11 and the second plug-fit portion 218 may have a cross section in the shape of, including, but not limited to, semi-circle, circle, ellipse, oval, triangle, square, rectangle, trapezoid, hexagon or the like. Furthermore, the fitting between the first and second plug-fit portions 11, 218 includes, but is not limited to, an interference fit which is preferred, a clearance fit, or a transition fit. In addition, the plug-fitting may be combined with other connection means including, but not limited to, form fitting, friction fitting, adhesive or the like, and any combination thereof. For example, in an alternative embodiment, the first plug-fit portion 11 may comprise a hook having a cross section in the shape of rectangle, and the second plug-fit portion 218 may comprise a slot having a cross section in the shape of rectangle which is slightly larger than the rectangular first plug-fit portion 11.

The cover 3 at its top portion is provided with a cover hole 31 through which an adjusting seat 212 of the valve housing 21, an adjusting ring 24 and a valve shaft 22 of the valve core 2 extend. A flange 32 is integrally formed around the cover hole 31, and the flange 32 on its outer side forms a pressing shoulder 33 of the cover. After assembly, the pressing shoulder 33 abuts against a shoulder 211 of the valve housing 21 so as to press the valve core 2 onto the valve seat 1. The cover 3 at its bottom portion is provided with a skirt 34 having a greater diameter and including on its inner side a second mounting portion 34 configured to be threaded to the first mounting portion 13 of the valve seat 1. Provided below a position where the first mounting portion 13 is connected to the second mounting portion 34 is a sealing ring 18 for preventing the leakage between the cover 3 and the valve seat 1. Provided at a position where the valve housing 21 contacts with the valve seat 1 (a flange of the valve seat) is also a sealing ring 25 for preventing the leakage between the valve housing 21 and the valve seat 1.

Figures 1, 2:
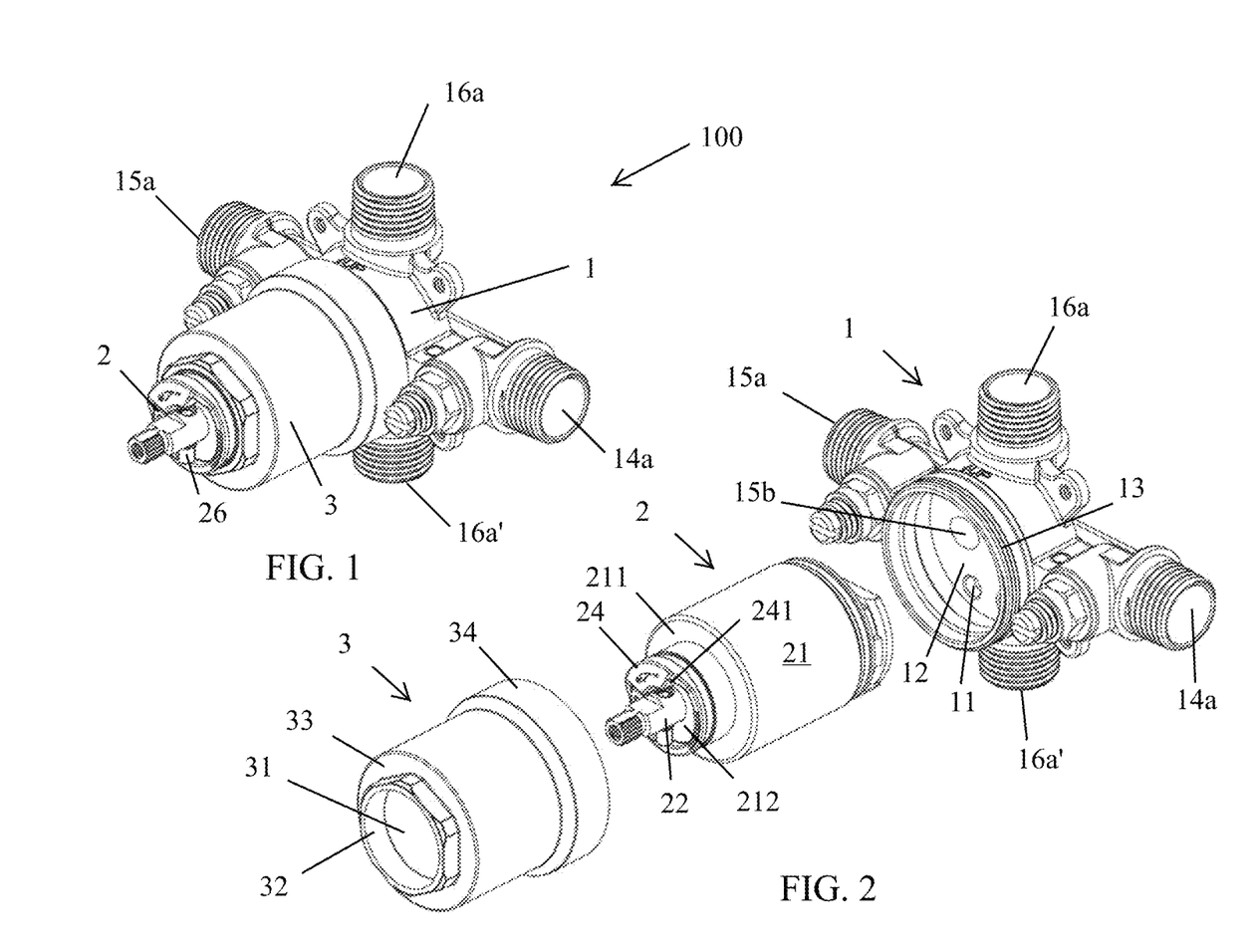
FIG. 1 shows a perspective view of the mixing valve according to an embodiment of the invention, with the mixing valve in the initial position.
FIG. 2 shows an exploded view of the subassemblies of the mixing valve of FIG. 1.
Figure 3:
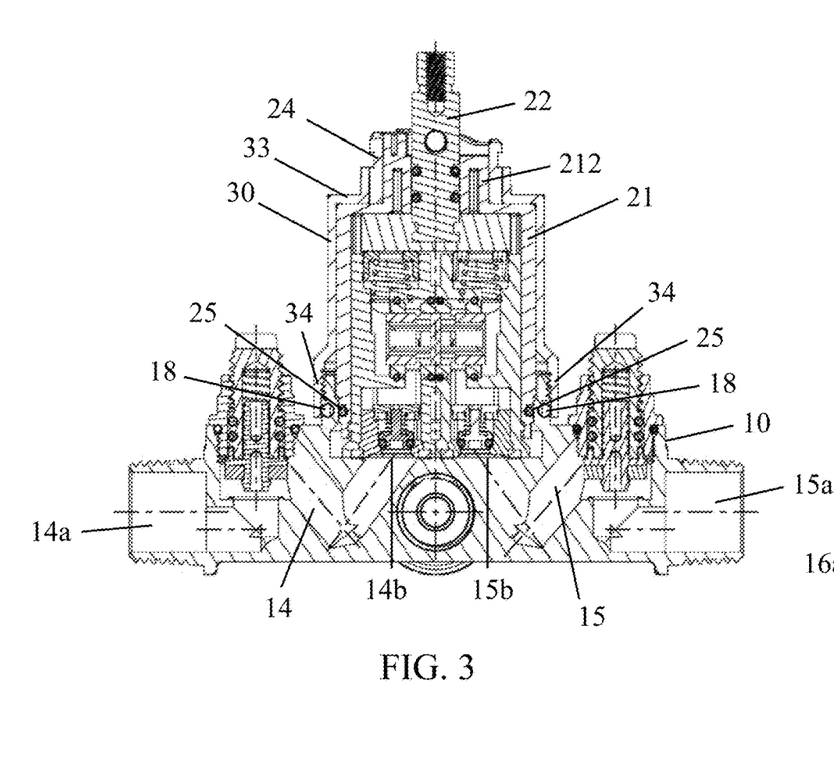
FIG. 3 shows a top sectional view of the mixing valve of FIG. 1.
Figure 4:
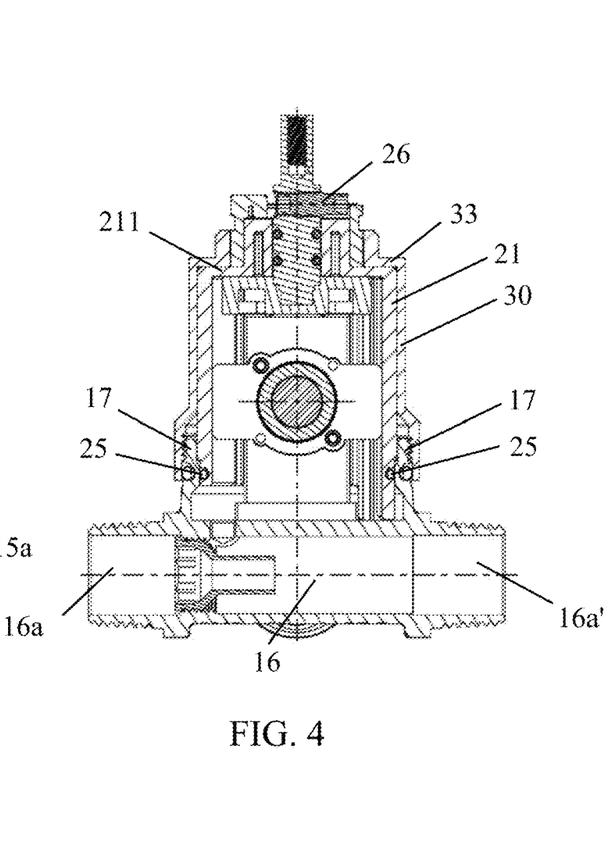
FIG. 4 shows a side sectional view of the mixing valve of FIG. 1.
Figure 5:
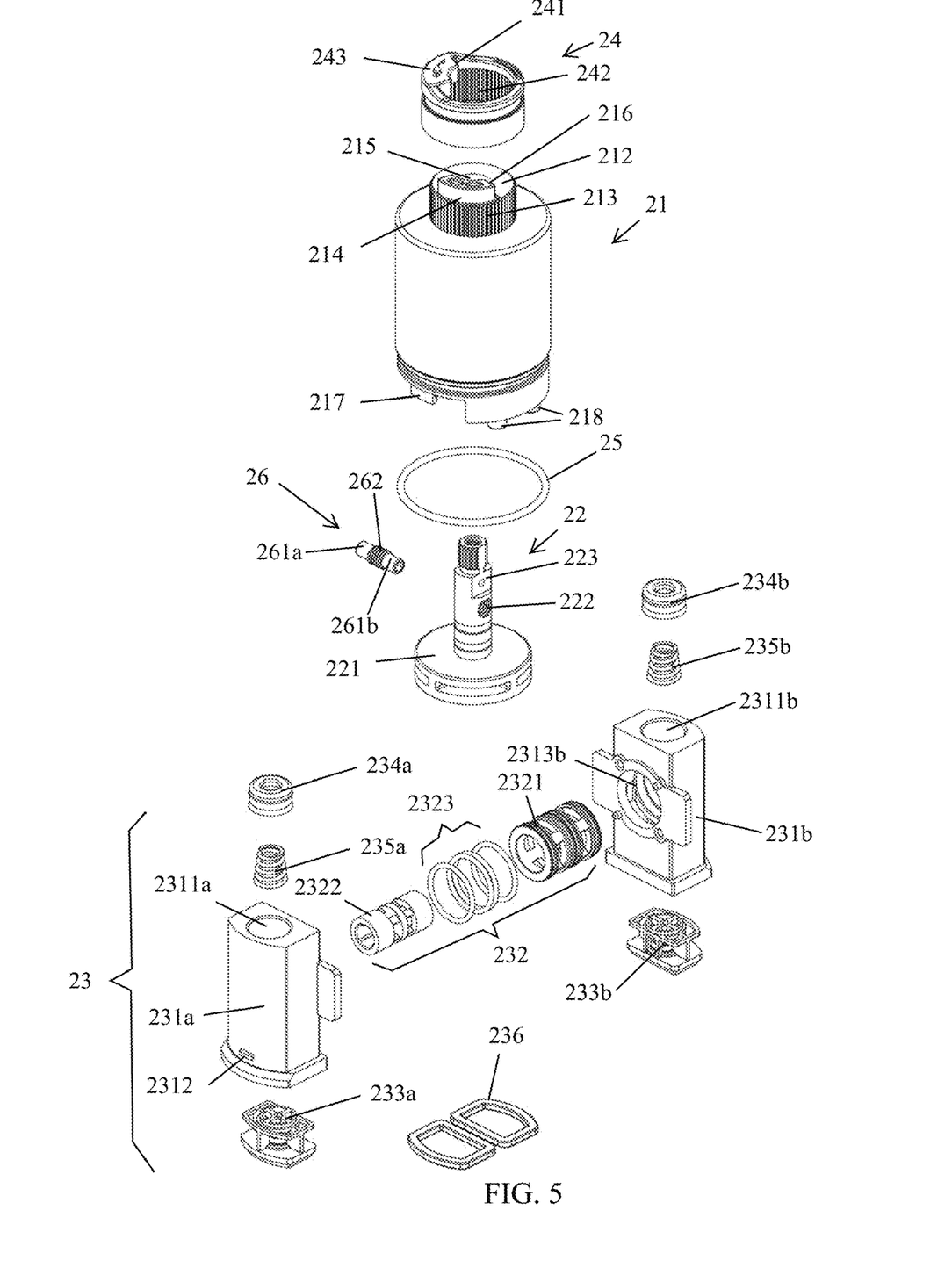
FIG. 5 shows an exploded view of the valve core of the mixing valve according to an embodiment of the invention.
Figure 6:
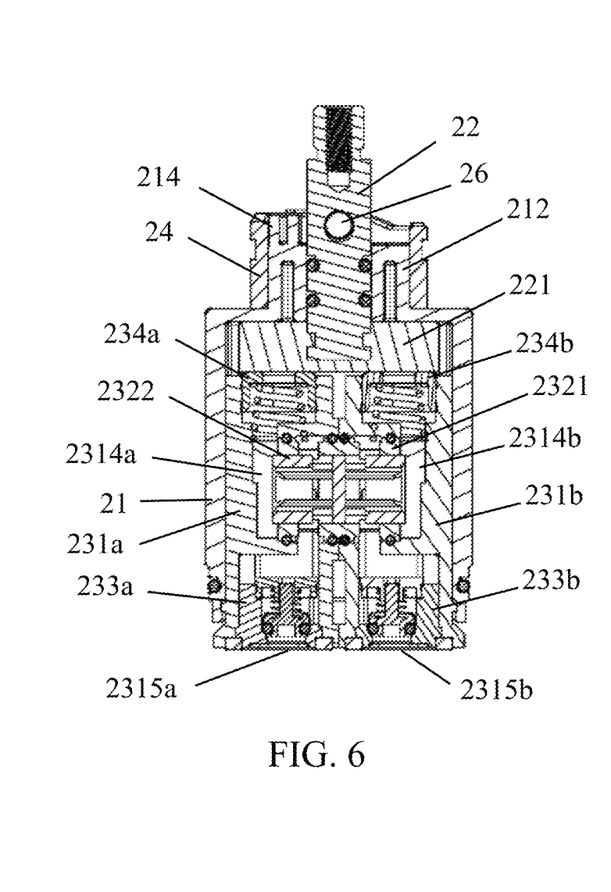
FIG. 6 shows a top sectional view of the valve core of FIG. 5.
Figure 7:
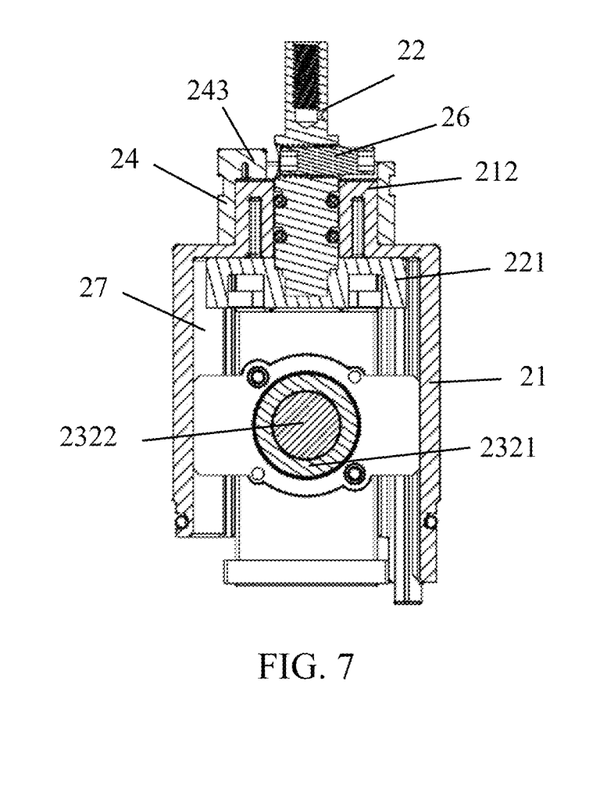
FIG. 7 shows a side sectional view of the valve core of FIG. 5.
Figure 8:
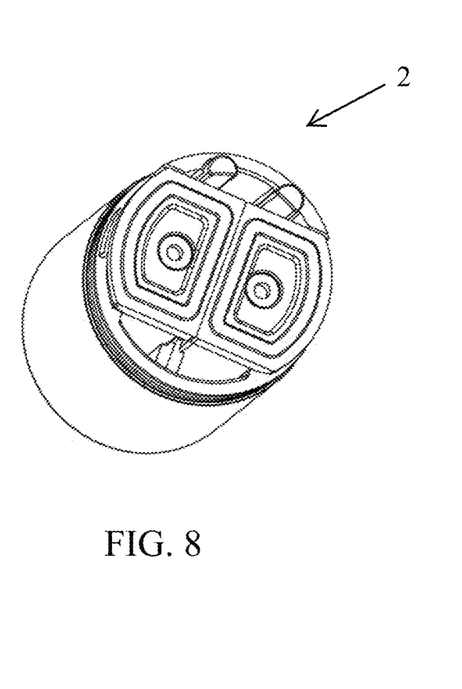
FIG. 8 shows a bottom perspective view of the valve core of FIG. 5.
Figure 9:
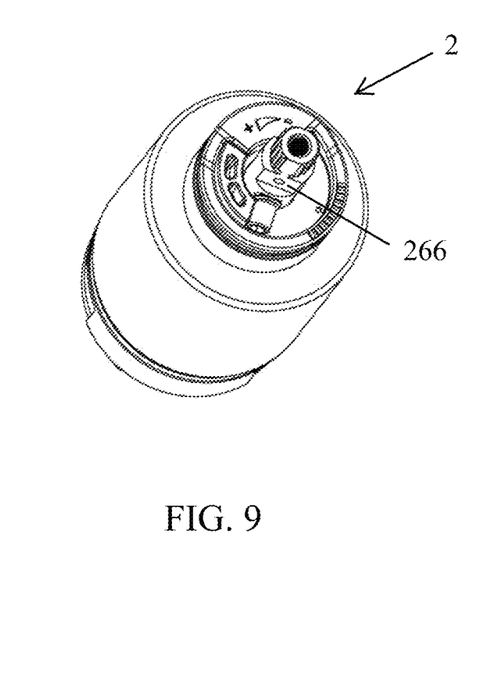
FIG. 9 shows a top perspective view of the valve core of FIG. 5.
Figure 10:
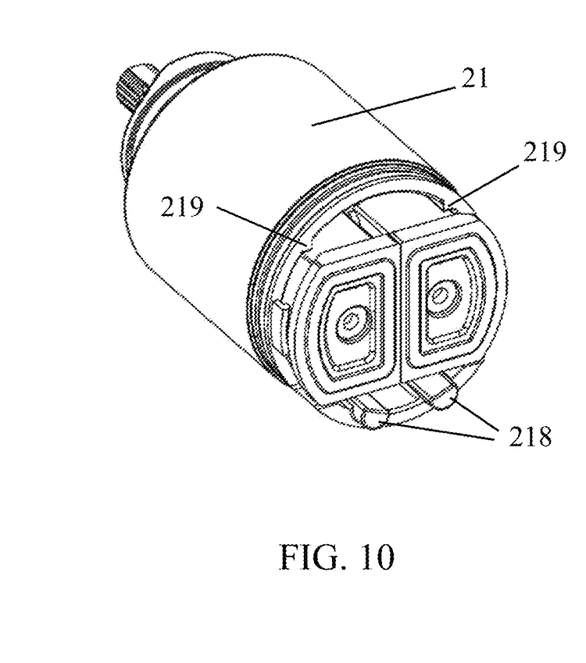
FIG. 10 shows a perspective view of the valve core according to an embodiment of the invention.

Referring to FIGS. 5-9, a valve core 2 according to an embodiment of the present invention is shown. The valve core 2 comprises an integral valve housing 21 and an adjusting ring 24. The adjusting ring 24 is provided at its inner side with an inner spline 242 and is formed at its top with a protrusion 243 protruding inwards and forming a second stop surface 241 at one side. The valve housing 21 is provided at its top with a housing hole 215 around which an adjusting seat 212 extending upwardly in an axial direction is integrally formed. The adjusting seat 212 at its periphery forms an outer spline 213 to engage with the inner spline 242 of the adjusting ring 24. Provided on a top face of the adjusting ring 212 is a sector projection 214 having a first stop surface 216 at one side. The valve housing 21 at its bottom portion is provided with two second plug-fit portions 218 in the shape of semi-cylinder (FIG. 10). Further, the valve housing 21 at circumferential positions corresponding to the valve module housing is provided with valve housing connecting portions 217 here in the form of hooks connected to corresponding connecting portions 2312 of the valve module housing here in the form of tabs, in order to secure the valve module 23 within the valve housing 21.

The valve core further comprises a valve shaft 22 extending through the housing hole 215 and the valve shaft 22 at its top portion forms two opposed truncated planes 223 configured to engage with a handle (not illustrated), such that the handle can be operatively connected to the portion of the valve shaft 22 that extends out from the housing hole 215 in two angle positions offset from each other by 180°. The valve shaft 22 at its bottom portion forms a valve plate 221, or is connected (not illustrated) thereto by means of such as, snap fitting, adhering or the like. The portion of the valve shaft 22 that extends out from the housing hole 215 also forms a radial through hole 222 for receiving a stop member 26 here in the form of a pin.

The stop member 26 forms a first stop portion and a second stop portion 261a, 261b at two end sections, respectively, and forms an outer thread 262 configured to engage with an inner thread inside the through hole 222 at its middle section, such that the stop member 26 may be configured to move back or forth in the radial direction within the through hole 222, in order to expose the first stop portion 261a or the second stop portion 261b to allow it to engage with the first stop surface 216 such that the mixing valve 100 is in the initial position or closing position, or with the second stop surface 241 such that the mixing valve 100 is in the final position or hot-water maximum position. It should be understood that the stop member 26 may have other forms and other fitting manners. For example, the stop member 26 and through hole 222 may have a cross section in the shape of circle, semi-circle, ellipse, oval, triangle, square, rectangle, trapezoid, hexagon or the like. The movement of the stop member 26 in the through hole 222 may be by means of screw-in, sliding or the like. In addition, the positioning of the stop member 26 within the through hole 222 may be by means of screw threads, stop block, snap fitting or the like.

The valve core further comprises a valve module 23 which comprises a first valve module housing 231a and a second valve module housing 231b. The first valve module housing 231a forms at its top portion a first outlet 2311a receiving a first sealing gasket 234a and a first spring 235a, forms at its bottom portion a first inlet 2315a receiving a first check valve 233a and a sealing ring 236, and forms at its middle portion a cold water chamber 2314a which forms at one side thereof a first mounting port (invisible from the figures) for mounting a pressure balancing valve subassembly 232. The second valve module housing 231b forms at its top portion a second outlet 2311b receiving a second sealing gasket 234b and a second spring 235b, forms at its bottom portion a second inlet 2315b receiving a second check valve 233b and a sealing ring 236, and forms at its middle portion a hot water chamber 2314b which forms at one side thereof a second mounting port 2313b for mounting the pressure balancing valve subassembly 232. A warm water chamber 27 is formed between the valve module housings 231a, 231b and the valve housing 21. The sealing gaskets 234a, 234b is sealingly connected to the valve plate 221. The pressure balancing valve subassembly 232 comprises a balancing valve sleeve 2321, a spool 2322 and sealing rings 2323. The check valves and pressure balancing valve subassembly 232 may be of the type or operate in the know manners, which will not be detailed for concise.

Now the flowing path of water flow will be briefly introduced. The cold water flows from the laid cold water tube (not shown) into the cold water inlet 14a of the valve seat 1, and further flows through the cold water conduit 14, the cold water outlet 14b, the first inlet 2315a, the cold water chamber 2314a, the pressure balancing valve subassembly 232, the first outlet 2311a, the valve plate 221, the warm water chamber 27, and the warm water conduit 16, to the upper warm water outlet 16a or the lower warm water outlet 16a'; the hot water flows from the laid hot water tube (not shown) into the hot water inlet 15a of the valve seat 1, and further flows through the hot water conduit 15, the hot water outlet 15b, the second inlet 2315b, the hot water chamber 2314b, the pressure balancing valve subassembly 232, the second outlet 2311b, the valve plate 221, the warm water chamber 27, and the warm water conduit 16, to the upper warm water outlet 16a or the lower warm water outlet 16a'.

According to the present invention, the sealing gaskets 234a, 234b and its springs 235a, 235b, the pressure balancing valve subassembly 232 and the check valves 233a, 233b are integrated into the valve module housings 231a, 231b, as contrary the prior art configurations of separating the sealing gaskets 234a, 234b and its springs 235a, 235b from the pressure balancing valve subassembly 232 by a partition in the valve housing 21, or separating the pressure balancing valve subassembly 232 from the check valves 233a, 233b by a partition in the valve housing 21. This allows a more compact structure of the valve module 23, and improves the ability of the valve module as a whole to withstand the pressure of cold and hot waters.

Figure 11:
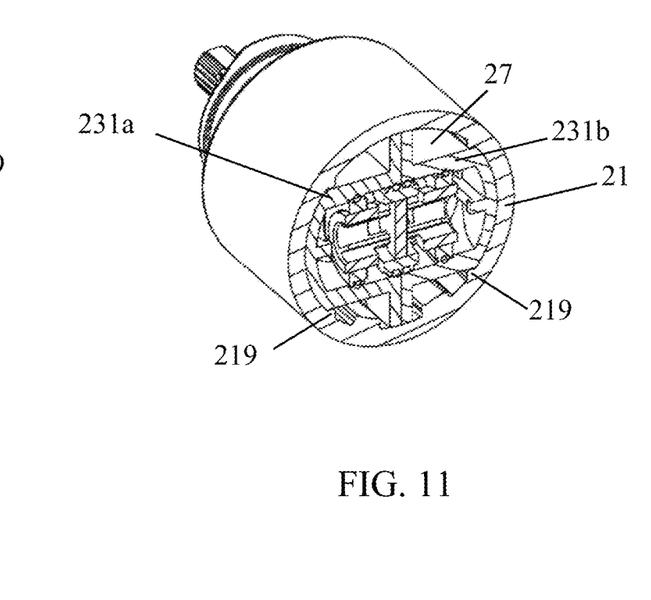
FIG. 11 shows a perspective view of a partially cut-off valve core of FIG. 10.

Referring now to FIGS. 10 and 11, a valve core according to an embodiment of the present invention is shown in a perspective view and a sectional perspective view respectively. As illustrated, by means of ridges 219 in the valve housing 21, the valve module housings 231a, 231b are held within a holding groove extending axially and formed between the ridges 219. The warm water chamber 27 is formed between the valve housing 21 and the valve module housing 231a, 231b. The second plug-fit portions 218 in the form of semi-cylindrical feet are formed at the bottom of the valve housing 21.

Figure 12:
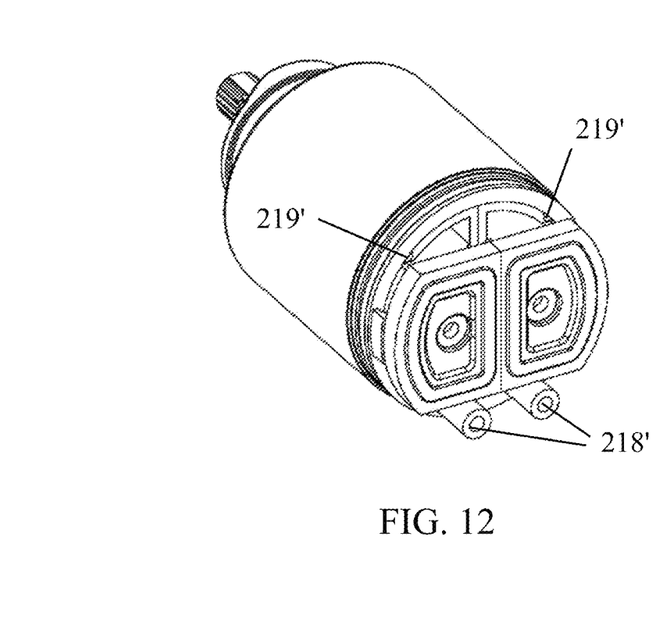
FIG. 12 shows a perspective view of the valve core according to another embodiment of the invention.
Figure 13:
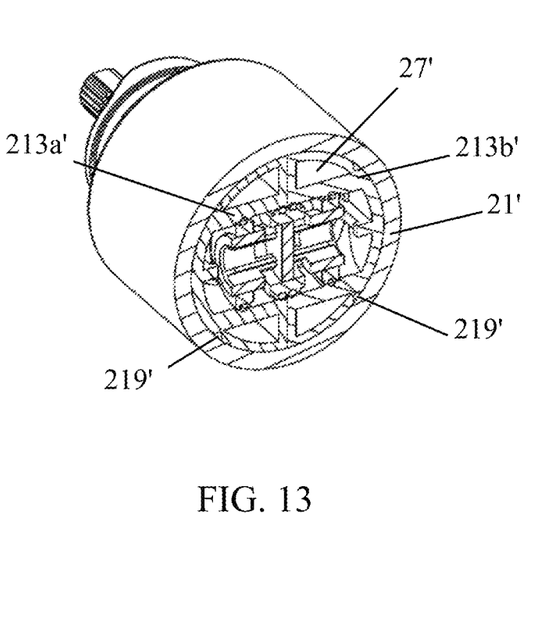
FIG. 13 shows a perspective view of a partially cut-off valve core of FIG. 12.

Referring now to FIGS. 12 and 13, a valve core according to another embodiment of the present invention is shown in a perspective view and a sectional perspective view respectively. As illustrated, by means of ridges 219' in the valve housing 21', the valve module housings 231a', 231b' are held within a holding groove extending axially and formed between the ridges 219'. Interiors of the valve module housings 231a', 231b' form a portion of the warm chamber 27'. The second plug-fit portions 218' are formed at the bottom of the valve housing 21'. The second plug-fit portions 218' are in the form of circular feet having bottom opening or recess. Although not shown, the accommodating cavity 12 of valve seat 11 may form the first plug-fit portions having a corresponding shape, e.g. in the form of annular grooves.

Figure 14:
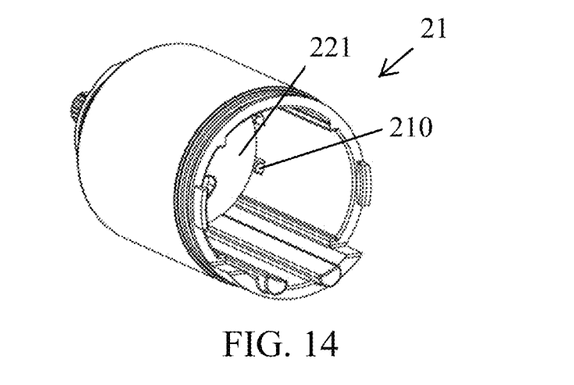
FIG. 14 shows a perspective view of the valve housing according to an embodiment of the invention.

Referring to FIG. 14, a valve housing 21 according to an embodiment of the present invention is shown. As illustrated, within the valve housing 21, a pressure bearing surface 210 is formed below and adjacent to the valve plate. The pressure bearing surface 210 preferably allows the valve module housings 231a, 231b to be positioned along the axial direction, and is beneficial to bearing the pressure from the cold and hot waters. In the illustrated embodiment, the pressure bearing surface 210 may be in the form of a (partial) rib extending in the axial direction of the valve housing.

Figure 15:
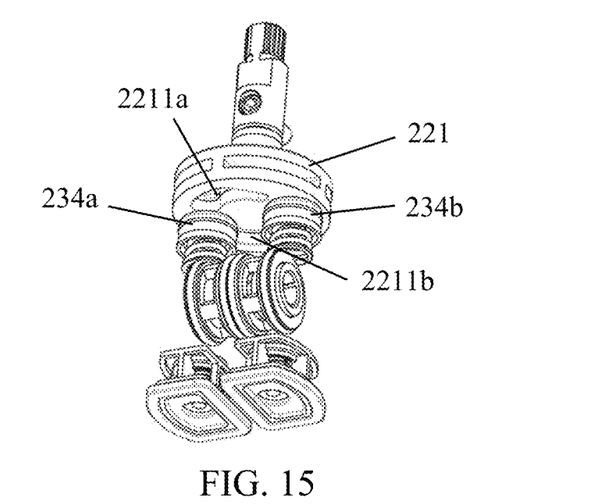
FIG. 15 shows a perspective view of inner components of the mixing valve according to an embodiment of the invention.

Referring now to FIG. 15, the inner components of the mixing valve 100 according to an embodiment of the present invention are shown in a perspective view. As illustrated, the sealing gaskets 234a, 234b directly abut against the valve plate 221, and cooperate with the regulating apertures 2211a, 2211b on the valve plate 221 to regulate the temperature and flow rate of the outflow water. Such regulation may be in a known manner in the art, such that no details are to be described for concise. In the embodiment, the illustrated valve plate 221 has a first layer and a second layer. Here, the sealing gaskets 234a, 234b and the valve plate 221 may be made of rubber.

Figure 16:
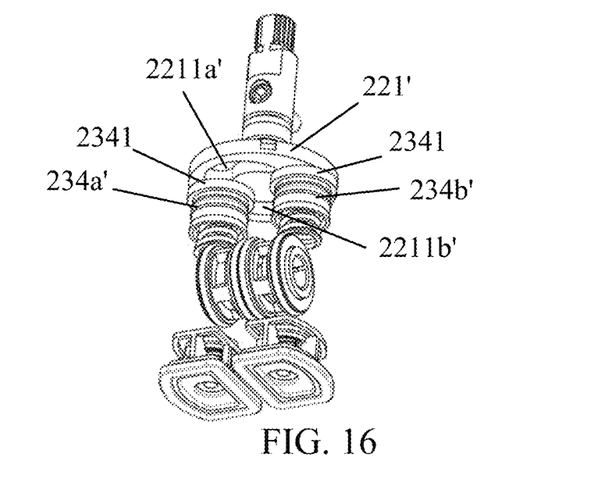
FIG. 16 shows a perspective view of inner components of the mixing valve according to another embodiment of the invention.

Referring now to FIG. 16, the inner components of the mixing valve 100 according to an embodiment of the present invention are shown in a perspective view. As illustrated, each sealing gasket 234a', 234b' is provided with a sliding pad 2341, which abuts against the valve plate 221' and cooperates with the respective regulating aperture 2211a', 2211b' on the valve plate 221' to regulate the temperature and flow rate of the outflow water. Such regulation may be in a known manner in the art. In the embodiment, the illustrated valve plate 221' has only one layer. Here, the sliding pads 2341 and valve plate 221' may be made of ceramic. Indeed, the features in the embodiments shown in FIGS. 15 and 16 may be combined or replaced with each other.

Figure 17:
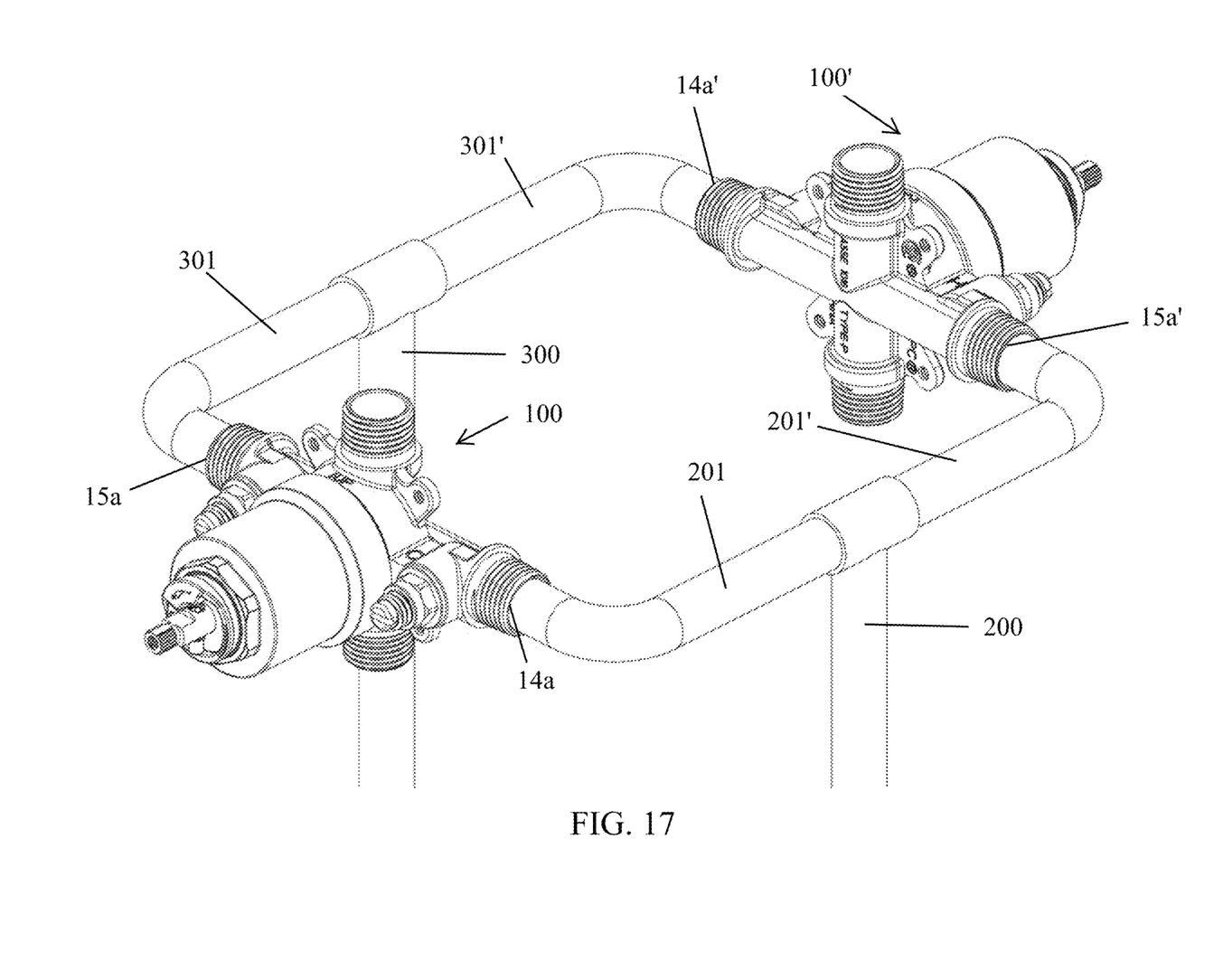
FIG. 17 shows an arrangement of the mixing valve in adjacent shower systems according to an embodiment of the invention.

Referring to FIG. 17, the arrangement of mixing valves 100, 100' according to an embodiment of the present invention is illustrated in adjacent shower systems such as in bathrooms. Typically, the two adjacent bathrooms share a common cold water main tube 200 and a common hot water main tube 300. The cold water main tube 200 is in communication with the cold water inlet 14a of the mixing valve 100 via a cold water tube 201, and is in communication with the hot water inlet 15a' of the other mixing valve 100' via a cold water tube 201'; the hot water main tube 300 is in communication with the hot water inlet 15a of the mixing valve 100 via a hot water tube 301, and is in communication with the cold water inlet 14a' of the other mixing valve 100' via a hot water tube 301'. It can be seen that, for the other mixing valve 100', the cold and hot water tubes 201', 301' are reversely connected to the hot and cold water inlets 15'a, 14a'. Such conventional arrangement of water tubes in the adjacent bathrooms will lead to issue in assembly of the mixing valve 100. In general, users are used to rotating the handle of the mixing valve 100 from left to right so as to open the faucet or the shower nozzle, until reaching the hot-water maximum position. In order to allow users to operate the handle in their habit even when the cold and hot water tubes are reversely connected, it is preferred that the mixing valve 100 may be adjustable or retrofitted accordingly to adapt to the different shower systems.

Figure 18:
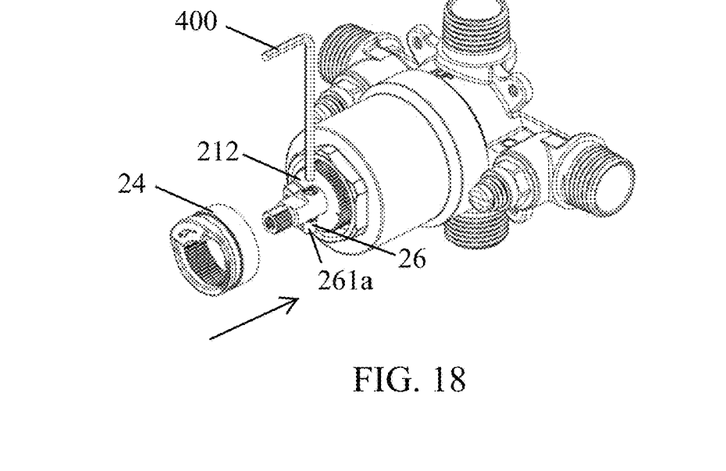
FIGS. 18-20 show the steps of retrofitting the mixing valve between adjacent bathrooms according to an embodiment of the invention.
Figure 19:
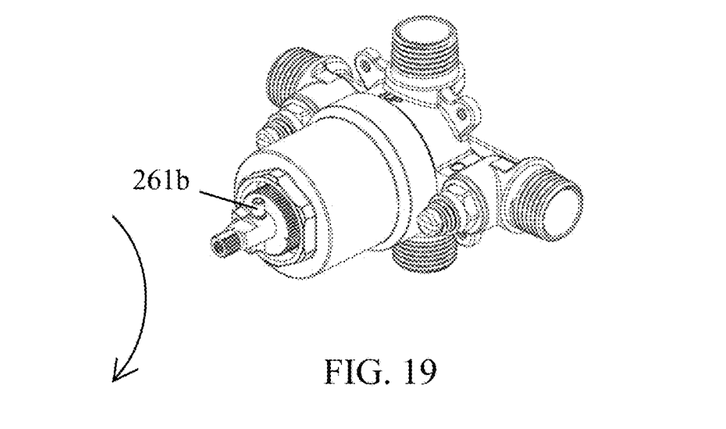
Figure 20:
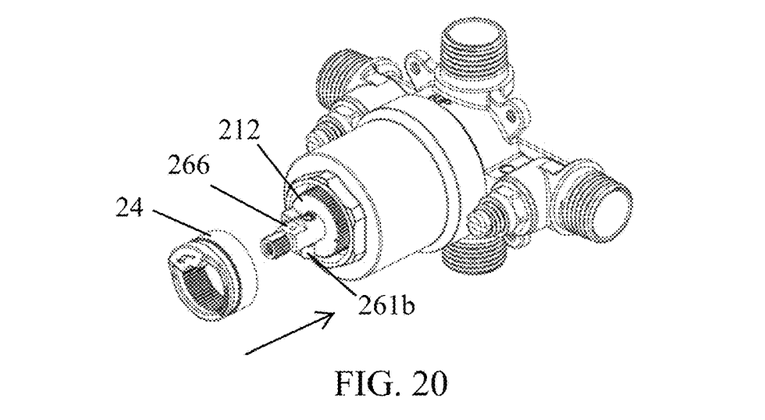

Referring now to FIGS. 18-20, a method for retrofitting a mixing valve 100 according to an embodiment of the present invention between the adjacent bathrooms is shown.

The mixing valve 100 according to the invention has a first installing configuration and a second installing configuration. As illustrated in FIG. 18, in the first installing configuration, the first stop portion 261a of the stop member 26 protrudes out and the second stop portion 261b is concealed within the valve shaft 22. In the first installing configuration, by means of the rotation of the valve shaft 22, the first stop portion 261a of the stop member 26 may engage with the first stop surface 216 of the adjusting seat 212 or the second stop surface 241, or may be rotated therebetween. In this case, the handle is connected to the valve shaft 22 in a first orientation (where the mark 266 is not visible) relative to the valve shaft 22, e.g. with the handle extending downwardly. As illustrated in FIG. 20, in the second installing configuration, the stop member 26 is arranged such that the second stop portion 261b protrudes out and the first stop portion 261a is concealed within the valve shaft 22. As compared to the first installing configuration, the valve shaft 22 in the second installing configuration is rotated by 180° relative to the valve seat (where the mark 266 faces upwardly), such that the handle is connected to the valve shaft 22 in a second orientation (where the mark 266 faces upwardly) relative to the valve shaft 22. Since the valve shaft 22 has been rotated by 180° relative to the valve seat, the orientations of the handle relative to the valve seat are not changed actually, that is, the handle still extends downwardly. In other words, in the first and second installing configurations, the handle has the same installing orientations relative to the valve seat. In the second installing configuration, the valve shaft 22 is configured such that the second stop portion 261b my still engage with the same first stop surface 216 of the adjusting seat 212 or the same second stop surface 218, or may be rotated therebetween.

In order to enable connection of the handle with the valve shaft 22 in first and second angle positions which are offset by 180°, the end portion of the valve shaft 22 extending out from the valve housing 21 may have two truncated planes 223 parallel to each other, while the inner wall of the receiving bore for receiving the end portion of the valve shaft 22 may also have two corresponding truncated planes (not shown) parallel to each other, such that the handle may be selectively connected to the valve shaft in two different angle positions that are offset by 180 degree (while the handle may be in the same angle position relative to the valve seat or other components of the mixing valve than the valve shaft).

Referring to FIGS. 18-20 together with FIG. 17, the steps of method according to the present invention will now be described in detail. It should be understood by the skilled in the art that the method according to the invention may refer to either a method for retrofitting the mixing valve assembly suitable for an adjacent shower head, or a method for installing the mixing valve assembly.

In FIG. 18, the handle (not shown) is detached and the adjusting ring 24 is removed. Now the mixing valve is in the first installing configuration and the stop member 26 is in the first position (where the mark 266 is not visible), such that the first stop portion 261a protrudes out while the second stop portion 261b is concealed within the through hole 222 of the valve shaft 22. The stop member 26 (which may be provided with a tool bore such as a hexagon bore at either ends) is then screwed by a tool 400 such as a hexagon wrench. In FIG. 19, the stop member 26 has been screwed to a second position, such that the first stop portion 261a is concealed within the through hole 222 while the second stop portion 261b is exposed. Then, the stop member 26 which has been moved to the second position is rotated by 180 degrees to a position as shown in FIG. 20, forming the second installing configuration of the mixing valve 100 (where the mark 266 is visible on the top face of the valve shaft 22). Then, the adjusting ring is mounted back, and the handle is installed in the same orientation relative to the valve seat (but offset by 180° relative to the valve shaft 22).

Referring to FIG. 15, the condition of the inner features of the mixing valve 100 before retrofitted is shown. When the user rotates the handle from left to right to open the mixing valve 100, the first regulating aperture 2211a is first in communication with the second sealing gasket 234b connected to the cold water tube 201, and then the second regulating aperture 2211b is in communication with the first sealing gasket 234a connected to the hot water tube 301, such that the mixing valve 100 is operated to be opened from the initial position or closing position to the final position or hot-water maximum position. Having retrofitted the mixing valve 100 to adapt to the adjacent shower system in which the cold water tube 201 or 201' and the hot water tube 301 or 301' are reversely arranged, where the valve shaft 22 has been rotated by 180° from the initial position, when the user operates the mixing valve 100, the first regulating aperture 2211a is first in communication with the first sealing gasket 234a which now is connected to the cold water tube 201', and then the second regulating aperture 2211b is in communication with the second sealing gasket 234b which now is connected to the hot water tube 301', such that the user is still allowed to open the mixing valve from the initial position or closing position to the final position or hot-water maximum position by rotating the handle from left to right. As such, the users may have the consistent operations even in different shower systems, which result in the convenience and standardization of the operation of the mixing valve 100.

Although the invention has been explained in details above in the discussion of the embodiments, it should be understood that the embodiments are illustrative, but should not be construed as limitation. Having read this description, the skilled in the art may make various changes, modifications and alternatives to the illustrated embodiments without departing from the scope and spirit of the invention, which is solely defined by the appended claims and the equivalents thereto.

What is claimed is:

1. A valve core for mixing valve, comprising:
 a first stop surface and a second stop surface;
 a valve housing having a housing hole at a top thereof;
 a valve shaft rotatably received in the valve housing, with a top portion of the valve shaft extending out from the housing hole, and a bottom portion of the valve shaft provided with a valve plate including a first regulating aperture and second regulating aperture;
 a stop member, wherein the valve core defines an initial position in which the stop member engages with the first stop surface and a final position in which the stop member engages with the second stop surface, and the stop member is adjustably mounted to the portion of the valve shaft extending out from the housing hole so as to selectively protrude at either a first side or a second side of the valve shaft; and
 a through hole transversely extending through the valve shaft, wherein the stop member is configured as a pin adapted to be mounted in the through hole.

2. The valve core according to the claim 1, wherein the pin has an outer threaded portion and the through hole has an inner threaded portion configured to be mated with the outer threaded portion.

3. The valve core according to claim 2, wherein the valve housing has an adjusting seat integral with the valve housing and forming the first stop surface.

4. A mixing valve assembly comprising the valve core according to claim 2, and further comprising:
 a valve seat provided with a first fluid conduit, a second fluid conduit and at least one mixed fluid conduit;
 a pressing cover, the valve core being tightly pressed between the pressing cover and the valve seat; and
 a handle configured to be connected to the valve shaft;
 wherein the mixing valve assembly has a first installing configuration in which the stop member protrudes at the first side of the valve shaft and the handle is connected in a first orientation relative to the valve shaft, and a second installing configuration in which the stop member protrudes at the second side of the valve shaft and the handle is connected in a second orientation relative to the valve shaft.

5. The valve core according to claim 1, wherein the valve housing has an adjusting seat integral with the valve housing and forming the first stop surface.

6. The valve core according to the claim 5, wherein the valve core further comprises an adjusting ring fitted onto the adjusting seat and forming the second stop surface.

7. A mixing valve assembly comprising the valve core according to claim 6, and further comprising:
 a valve seat provided with a first fluid conduit, a second fluid conduit and at least one mixed fluid conduit;
 a pressing cover, the valve core being tightly pressed between the pressing cover and the valve seat; and a handle configured to be connected to the valve shaft;

wherein the mixing valve assembly has a first installing configuration in which the stop member protrudes at the first side of the valve shaft and the handle is connected in a first orientation relative to the valve shaft, and a second installing configuration in which the stop member protrudes at the second side of the valve shaft and the handle is connected in a second orientation relative to the valve shaft.

8. A mixing valve assembly comprising the valve core according to claim 5, and further comprising:

a valve seat provided with a first fluid conduit, a second fluid conduit and at least one mixed fluid conduit;

a pressing cover, the valve core being tightly pressed between the pressing cover and the valve seat; and a handle configured to be connected to the valve shaft;

wherein the mixing valve assembly has a first installing configuration in which the stop member protrudes at the first side of the valve shaft and the handle is connected in a first orientation relative to the valve shaft, and a second installing configuration in which the stop member protrudes at the second side of the valve shaft and the handle is connected in a second orientation relative to the valve shaft.

9. A mixing valve assembly comprising the valve core according to claim 1, and further comprising:

a valve seat provided with a first fluid conduit, a second fluid conduit and at least one mixed fluid conduit;

a pressing cover, the valve core being tightly pressed between the pressing cover and the valve seat; and a handle configured to be connected to the valve shaft;

wherein the mixing valve assembly has a first installing configuration in which the stop member protrudes at the first side of the valve shaft and the handle is connected in a first orientation relative to the valve shaft, and a second installing configuration in which the stop member protrudes at the second side of the valve shaft and the handle is connected in a second orientation relative to the valve shaft.

10. The mixing valve assembly according to the claim 9, wherein the top portion of the valve shaft has two truncated planes parallel to each other, and the handle comprises a receiving bore for receiving the top portion of the valve shaft, wherein the receiving bore includes on an inner wall thereof two corresponding truncated planes parallel to each other, such that the first orientation is offset from the second orientation by an angle of 180°.

11. The valve core according to claim 1, wherein the valve housing has an adjusting seat integral with the valve housing and forming the first stop surface.

12. A mixing valve assembly comprising the valve core according to claim 1, and further comprising:

a valve seat provided with a first fluid conduit, a second fluid conduit and at least one mixed fluid conduit;

a pressing cover, the valve core being tightly pressed between the pressing cover and the valve seat; and a handle configured to be connected to the valve shaft;

wherein the mixing valve assembly has a first installing configuration in which the stop member protrudes at the first side of the valve shaft and the handle is connected in a first orientation relative to the valve shaft, and a second installing configuration in which the stop member protrudes at the second side of the valve shaft and the handle is connected in a second orientation relative to the valve shaft.

* * * * *